(12) United States Patent
Shinomiya

(10) Patent No.: US 10,409,594 B2
(45) Date of Patent: Sep. 10, 2019

(54) PROCESSING CIRCUIT AND CONTROL METHOD OF PROCESSING CIRCUIT

(71) Applicant: FUJITSU LIMITED, Kawasaki-shi, Kanagawa (JP)

(72) Inventor: Kensuke Shinomiya, Inagi (JP)

(73) Assignee: FUJITSU LIMITED, Kawasaki (JP)

(*) Notice: Subject to any disclaimer, the term of this patent is extended or adjusted under 35 U.S.C. 154(b) by 55 days.

(21) Appl. No.: 15/898,260

(22) Filed: Feb. 16, 2018

(65) Prior Publication Data
US 2018/0260223 A1    Sep. 13, 2018

(30) Foreign Application Priority Data

Mar. 13, 2017 (JP) .................. 2017-047301

(51) Int. Cl.
G06F 9/30 (2018.01)

(52) U.S. Cl.
CPC ........ *G06F 9/30018* (2013.01); *G06F 9/3001* (2013.01); *G06F 9/30029* (2013.01)

(58) Field of Classification Search
None
See application file for complete search history.

(56) References Cited

U.S. PATENT DOCUMENTS

| 4,945,509 A | 7/1990 | Barrett et al. |
| 2006/0218377 A1* | 9/2006 | Boggs ............... G06F 9/30163 712/200 |
| 2008/0307204 A1* | 12/2008 | Tam ................... G06F 9/30032 712/210 |
| 2018/0157463 A1* | 6/2018 | Lutz ...................... G06F 7/483 |

FOREIGN PATENT DOCUMENTS

| JP | 60-258642 | 12/1985 |
| JP | 2-12327 | 1/1990 |

* cited by examiner

Primary Examiner — Corey S Faherty
(74) Attorney, Agent, or Firm — Fujitsu Patent Center

(57) ABSTRACT

A processing circuit is configured to receive a first binary number composed of a plurality of bits and a second binary number composed of a plurality of bits, and with a digit of the most significant 1-valued bit in the first binary number composed of the plural bits being defined as a first bit digit and with a digit of a bit having a value of 1 first in a higher-order direction than the first bit digit in the second binary number composed of the plural bits being defined as a second bit digit, output a third binary number composed of a plurality of bits out of which a bit corresponding to the second bit digit has a value of 1 and other bits have values of 0, the processing circuit including: a high-order mask processing unit; a low-order mask processing unit; and an output synthesizing unit.

12 Claims, 14 Drawing Sheets

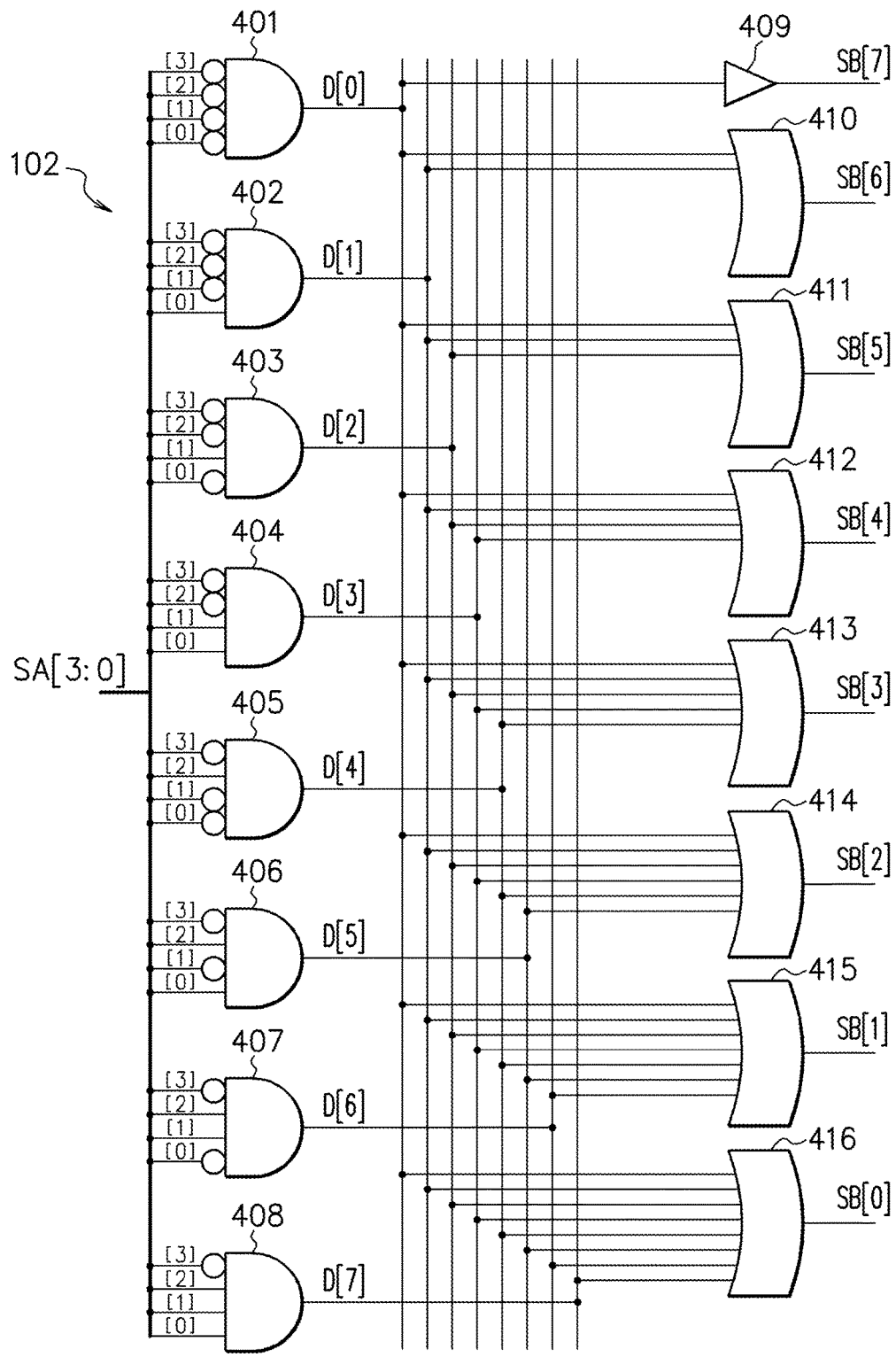
F I G. 4

F I G. 6
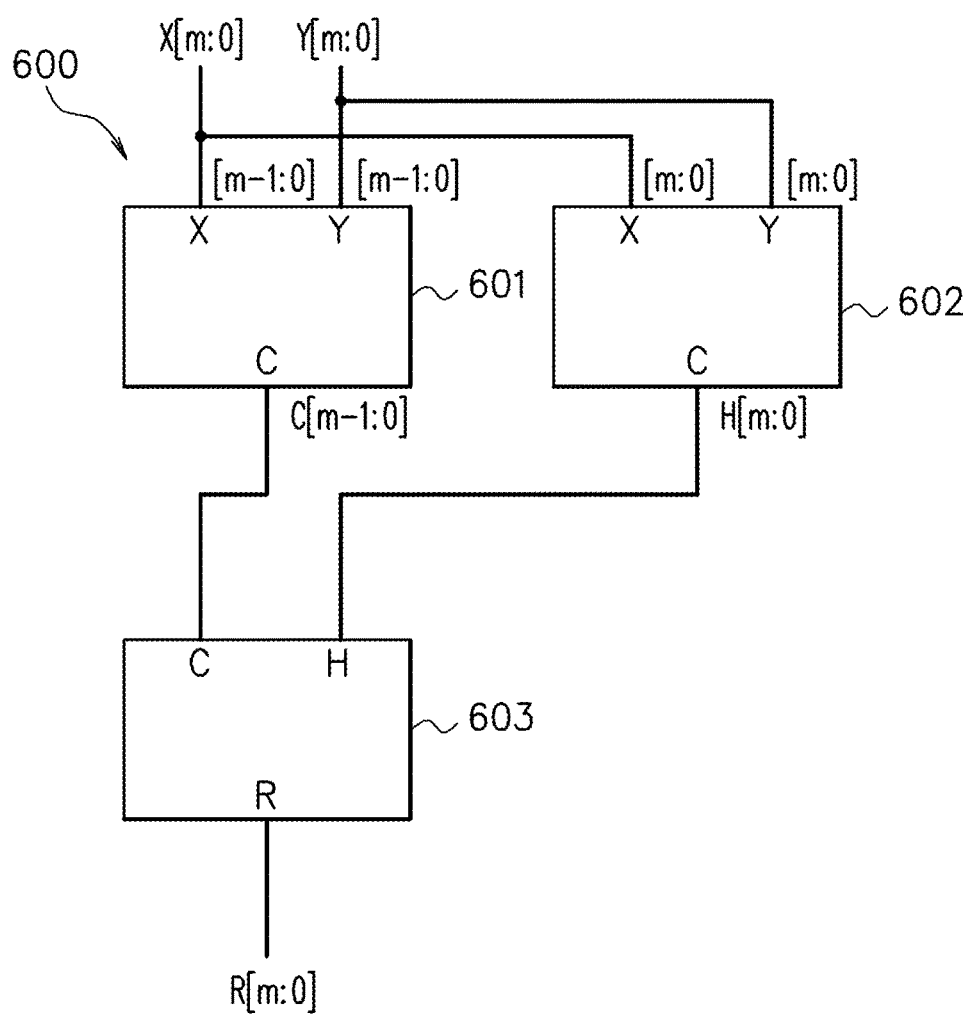

F I G. 7

| X | X[7] | X[6] | X[5] | X[4] | X[3] | X[2] | X[1] | X[0] |
|---|---|---|---|---|---|---|---|---|
|   | 0 | 0 | 0 | 0 | 0 | 1 | 0 | 1 |
| Y | Y[7] | Y[6] | Y[5] | Y[4] | Y[3] | Y[2] | Y[1] | Y[0] |
|   | 0 | 1 | 0 | 1 | 0 | 0 | 1 | 0 |
| H | H[7] | H[6] | H[5] | H[4] | H[3] | H[2] | H[1] | H[0] |
|   | 0 | 1 | 0 | 1 | 0 | 0 | 0 | 0 |
| C | C[6] | C[5] | C[4] | C[3] | C[2] | C[1] | C[0] | C[-1] |
|   | 0 | 0 | 0 | 1 | 1 | 0 | 1 | 1 |
| R | R[7] | R[6] | R[5] | R[4] | R[3] | R[2] | R[1] | R[0] |
|   | 0 | 0 | 0 | 1 | 0 | 0 | 0 | 0 |

F I G. 13
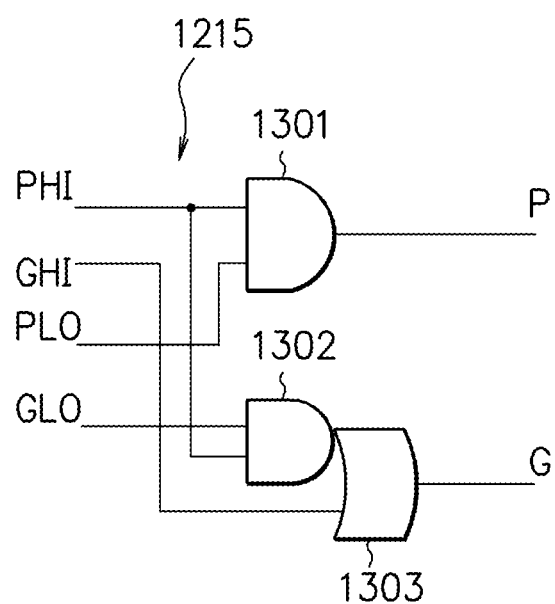

FIG. 14A

|  | AREA | PROCESSING TIME |
|---|---|---|
| INVERTER | 0.5 | 0.5 |
| BUFFER | 1 | 1 |
| 2-INPUT NAND/2-INPUT NOR | 1 | 1 |
| 3-INPUT NAND/3-INPUT NOR | 1.5 | 1.5 |
| 4-INPUT NAND/4-INPUT NOR | 2 | 2 |
| 5-INPUT NAND/5-INPUT NOR | 2.5 | 2.5 |
| 6-INPUT NAND/6-INPUT NOR | 3 | 3 |
| 7-INPUT NAND/7-INPUT NOR | 3.5 | 3.5 |
| 8-INPUT NAND/8-INPUT NOR | 4 | 4 |
| 2-INPUT AND/2-INPUT OR | 1.5 | 1.5 |
| 3-INPUT AND/3-INPUT OR | 2 | 2 |
| 4-INPUT AND/4-INPUT OR | 2.5 | 2.5 |
| 5-INPUT AND/5-INPUT OR | 3 | 3 |
| 6-INPUT AND/6-INPUT OR | 3.5 | 3.5 |
| 7-INPUT AND/7-INPUT OR | 4 | 4 |
| 8-INPUT AND/8-INPUT OR | 4.5 | 4.5 |
| 2-INPUT EOR | 2.5 | 2.5 |
| 2ANDOR | 2.5 | 1.5 |
| ANDOR | 2 | 1.5 |

FIG. 14B

|  | AREA | PROCESSING TIME |
|---|---|---|
| BASIC TECHNOLOGY | 146 | 25 |
| FIRST EMBODIMENT | 84 | 12 |
| SECOND EMBODIMENT | 92 | 8.5 |

_(US 10,409,594 B2)_

PROCESSING CIRCUIT AND CONTROL METHOD OF PROCESSING CIRCUIT

CROSS-REFERENCE TO RELATED APPLICATION

This application is based upon and claims the benefit of priority of the prior Japanese Patent Application No. 2017-047301, filed on Mar. 13, 2017, the entire contents of which are incorporated herein by reference.

FIELD

The embodiments discussed herein are directed to a processing circuit and a control method of a processing circuit.

BACKGROUND

There is known a mask generator that generates a mask having a plurality of data bits with a first logic level and a plurality of data bits with a second logic level (refer to Patent Document 1). A decoder decodes a first binary address indicating a start data bit position for data masking and a second binary address indicating an end data bit position for data masking. In response to an output of the decoder, a first lookahead carry unit generates a first carry bit that is to be propagated from a low-order bit position to a high-order bit position in a mask. In response to the output of the decoder, a second lookahead carry unit generates a second carry bit that is to be propagated from a high-order bit position to a low-order bit position in the mask.

There is also known a masking circuit that includes a first mask generating circuit and a second mask generating circuit and supplies elements of mask data that the second mask generating circuit outputs, as auxiliary inputs to a plurality of unit mask generating circuits of the first mask generating circuit (refer to Patent Document 2). In the first mask generating circuit, the plural unit mask generating circuits are arranged in parallel, the plural unit mask generating circuits each receiving n-bit binary data and the auxiliary input outputted from the second mask generating circuit and generating and outputting mask data in which a logical product as an element is included and a carry output. The second mask generating circuit receives the plural carry outputs outputted from the respective plural unit mask generating circuits of the first mask generating circuit and logic value "1" or an auxiliary input supplied from a similar masking circuit on a post-stage and generates and outputs mask data in which logical products as elements are included and a carry output.

[Patent Document 1] Japanese Laid-open Patent Publication No. 02-12327

[Patent Document 2] Japanese Laid-open Patent Publication No. 60-258642

A processing circuit is required to perform various kinds of processing, and an increase in its processing speed is required.

SUMMARY

A processing circuit is a processing circuit configured to receive a first binary number composed of a plurality of bits and a second binary number composed of a plurality of bits, and with a digit of the most significant 1-valued bit in the first binary number composed of the plural bits being defined as a first bit digit and with a digit of a bit having a value of 1 first in a higher-order direction than the first bit digit in the second binary number composed of the plural bits being defined as a second bit digit, output a third binary number composed of a plurality of bits out of which a bit corresponding to the second bit digit has a value of 1 and other bits have values of 0, the processing circuit including: a high-order mask processing unit configured to receive the first binary number and the second binary number and output a fourth binary number composed of a plurality of bits out of which a bit corresponding to the second bit digit has a value of 1 and a higher-order bit than the bit corresponding to the second bit digit has a value of zero; a low-order mask processing unit configured to receive the first binary number and the second binary number and output a fifth binary number composed of a plurality of bits out of which a bit corresponding to the second bit digit has a value of 1 and a lower-order bit than the bit corresponding to the second bit digit has a value of 0; and an output synthesizing unit configured to receive the fourth binary number and the fifth binary number and output the third binary number composed of the plural bits out of which the bit corresponding to the second bit digit has the value of 1 and the other bits have the values of 0.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a circuit diagram illustrating a configuration example of a right shift unit in FIG. 1;

FIG. 6 is a diagram illustrating a configuration example of a processing circuit according to a first embodiment;

FIG. 7 is a chart illustrating an example of a first operand, a second operand, and an output value;

FIG. 13 is a circuit diagram illustrating a configuration example of a carry generating unit in FIG. 12;

FIG. 14A is a chart illustrating ratios of the area and the processing time of circuit elements; and FIG. 14B is a chart illustrating ratios of the area and the processing time of processing circuits.

DESCRIPTION OF EMBODIMENTS

First Embodiment

Figure 1:
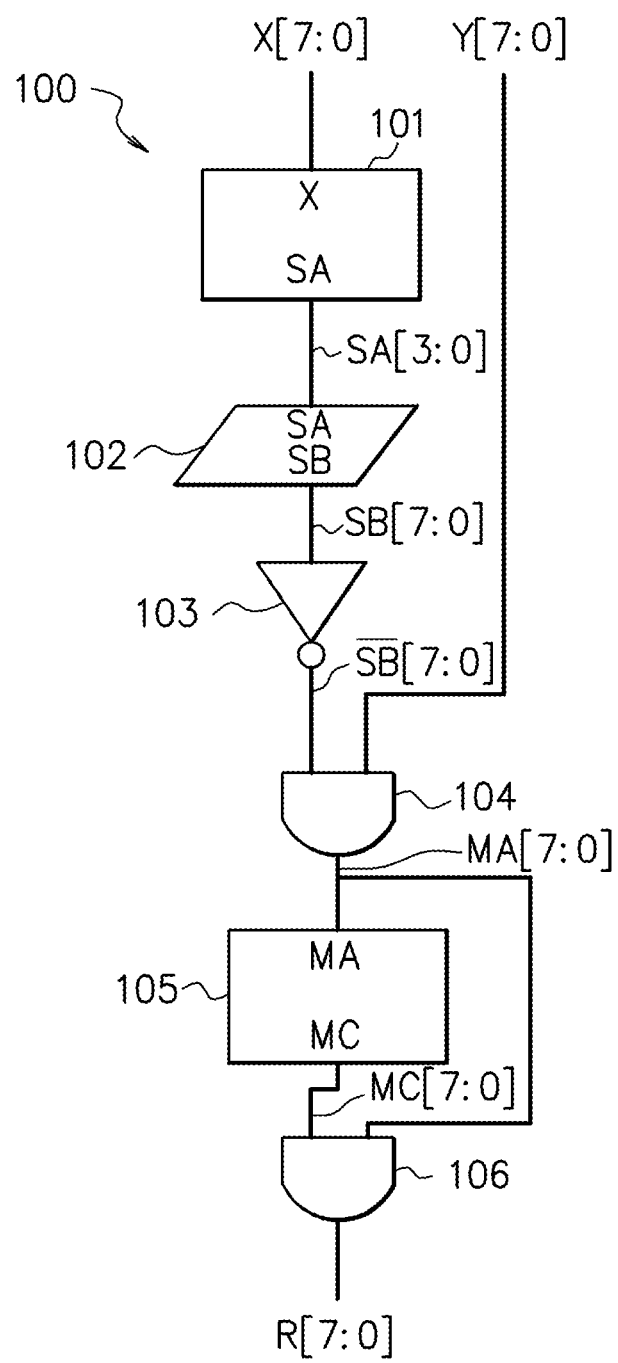
FIG. 1 is a circuit diagram illustrating a configuration example of a processing circuit according to basic technology.
Figure 2:
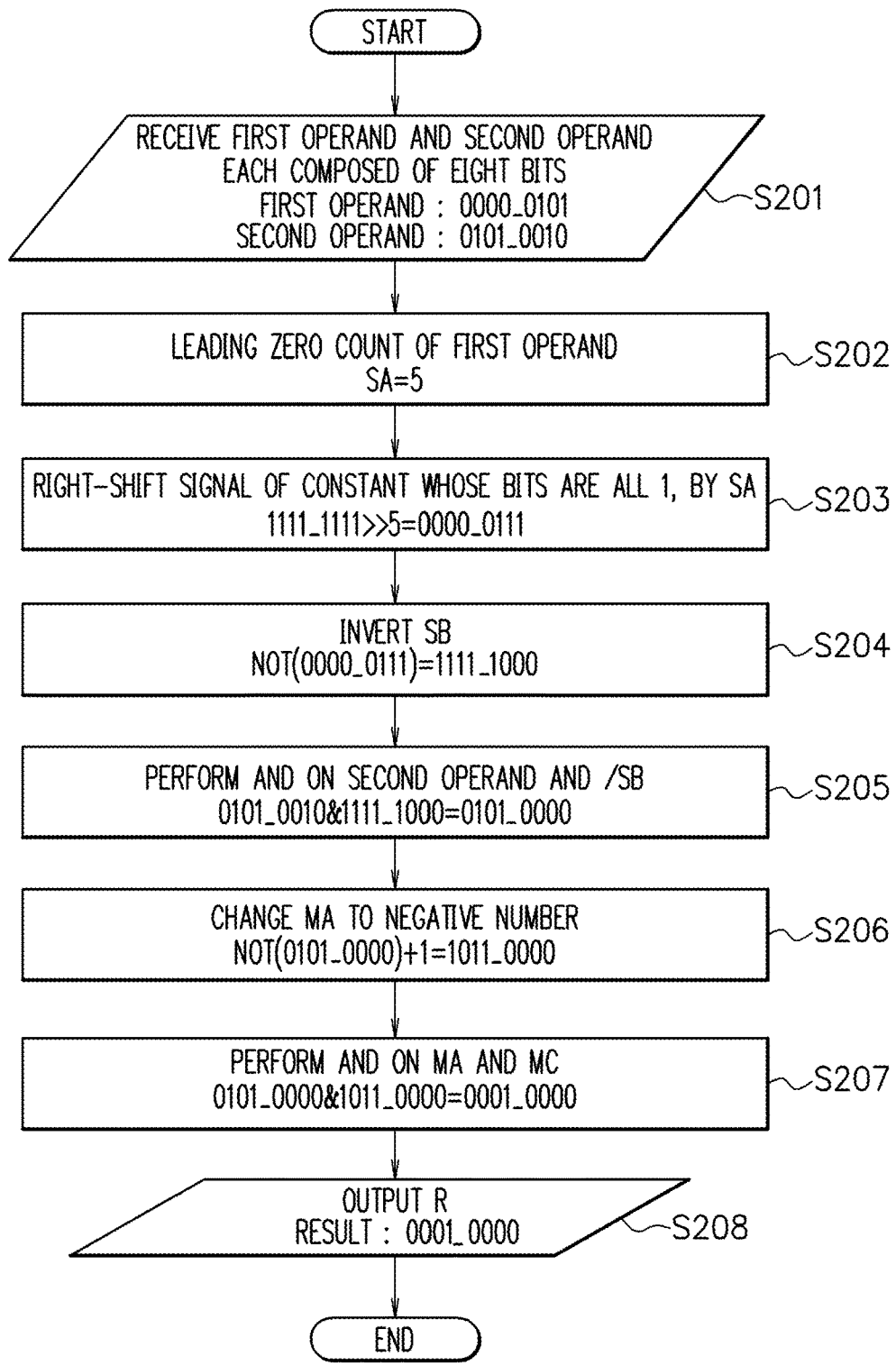
FIG. 2 is a flowchart illustrating a control method of the processing circuit in FIG. 1.

FIG. 1 is a circuit diagram illustrating a configuration example of a processing circuit 100 according to basic technology, and FIG. 2 is a flowchart illustrating a control method of the processing circuit 100. For loop processing, processors sometimes need to obtain a later-described output value R[7:0] based on a first operand X[7:0] and a second operand Y[7:0] of an instruction. Here, the processors include processing units such as CPU (Central Processing Unit), MPU (Micro Processing Unit), GPU (Graphical Processing Unit), and DSP (Digital Signal Processing Unit). If the processor performs an operation on the first operand X[7:0] and the second operand Y[7:0] which are the objects of the operation, by software to obtain the output value R[7:0], the operation takes a long time. To increase its operation speed, the processing circuit 100 is configured by hardware. The processing circuit 100 is capable of outputting the output value R[7:0] fast when receiving the first operand X[7:0] and the second operand Y[7:0]. When giving the first operand X[7:0] and the second operand Y[7:0] to the processing circuit 100, the processor is capable of obtaining the output value R[7:0] fast from the processing circuit 100. The first operand X[7:0], the second operand Y[7:0], and the output value R[7:0] are each an 8-bit binary number.

As illustrated in, for example, FIG. 7, the processing circuit 100 receives the first operand X[7:0] composed of a plurality of bits and the second operand Y[7:0] composed of a plurality of bits, and with a digit of the most significant 1-valued bit in the first operand X[7:0] composed of the plural bits being defined as a first bit digit (for example, X[2]) and with a digit of a bit having 1 first in a higher-order direction than the first bit digit in the second operand Y[7:0] composed of the plural bits being defined as a second bit digit (for example, Y[4]), the processing circuit 100 outputs the output value R[7:0] composed of the plural bits out of which a bit (for example, R[4]) corresponding to the second bit digit is 1 and the other bits (for example, R[0] to R[3] and R[5] to R[7]) are 0.

The processing circuit 100 includes a leading zero count unit 101, a right shift unit 102, an inverter 103, a logical product operation circuit 104, a complement processing unit 105, and a logical product operation circuit 106. The logical product operation circuits 104 and 106 are each a 2-input AND circuit. Hereinafter, a control method of the processing circuit 100 will be described.

First, at Step S201, the processing circuit 100 receives the 8-bit first operand X[7:0] and the 8-bit second operand Y[7:0]. For example, the first operand X[7:0] is "0000_0101" and the second operand Y[7:0] is "0101_0010".

Next, at Step S202, in order to search for a digit of a 1-valued bit first appearing when seen from a MSB (Most Significant Bit) side, that is, a digit of the most significant 1-valued bit in the first operand X[7:0], the leading zero count unit 101 outputs the number of zeros continuing from the highest-order position of the first operand X[7:0], as a 4-bit leading zero count value SA[3:0]. For example, if the first operand X[7:0] is "0000_0101", the leading zero count value SA[3:0] is 5.

Next, at Step S203, the right shift unit 102 outputs an 8-bit binary number SB[7:0] which is obtained when an 8-bit constant "1111_1111" whose bits are all 1 are right-shifted by the leading zero count value SA[3:0]. For example, if the leading zero count value SA[3:0] is 5, the binary number SB[7:0] is "0000_0111".

Next, at Step S204, the inverter 103 outputs an 8-bit binary number /SB[7:0] which is the result of the logical inversion of the 8-bit binary number SB[7:0]. For example, if the binary number SB[7:0] is "0000_0111", the binary number /SB[7:0] is "1111_1000".

Next, at Step S205, the logical product operation circuit 104 outputs an 8-bit binary number MA[7:0] which is the result of a logical product operation on the second operand Y[7:0] and the binary number /SB[7:0]. For example, if the second operand Y[7:0] is "0101_0010" and the binary number /SB[7:0] is "1111_1000", the binary number MA[7:0] is "0101_0000".

Next, at Step S206, the complement processing unit 105 inverts a positive-negative sign of the positive 8-bit binary number MA[7:0] to output a negative 8-bit binary number MC[7:0]. Specifically, as complement processing, the complement processing unit 105 outputs the binary number MC[7:0] that it obtains by adding 1 to a logically inverted value of the binary number MA[7:0]. For example, if the binary number MA[7:0] is "0101_0000", the binary number MC[7:0] is "1011_0000".

Next, at Step S207, the logical product operation circuit 106 outputs the 8-bit output value R[7:0] which is the result of a logical product operation on the binary number MA[7:0] and the binary number MC[7:0]. For example, if the binary number MA[7:0] is "0101_0000" and the binary number MC[7:0] is "1011_0000", the output value R[7:0] is "0001_0000".

Next, at Step S208, the processing circuit 100 outputs the output value R[7:0]. As described above, the processing circuit 100, for example, receives "0000_0101" as the first operand X[7:0] and "0101_0010" as the second operand Y[7:0] to output "0001_0000" as the output value R[7:0]. With the digit of the most significant 1-valued bit in the first operand X[7:0] being defined as the first bit digit (for example, X[2]) and with the digit of the bit having 1 first in the higher-order direction than the first bit digit in the second operand Y[7:0] being defined as the second bit digit (for example, Y[4]), the processing circuit 100 outputs the output value R[7:0] in which the bit (for example, R[4]) corresponding to the second bit digit is 1 and the other bits (for example, R[0] to R[3] and R[5] to R[7]) are 0.

Figure 3:
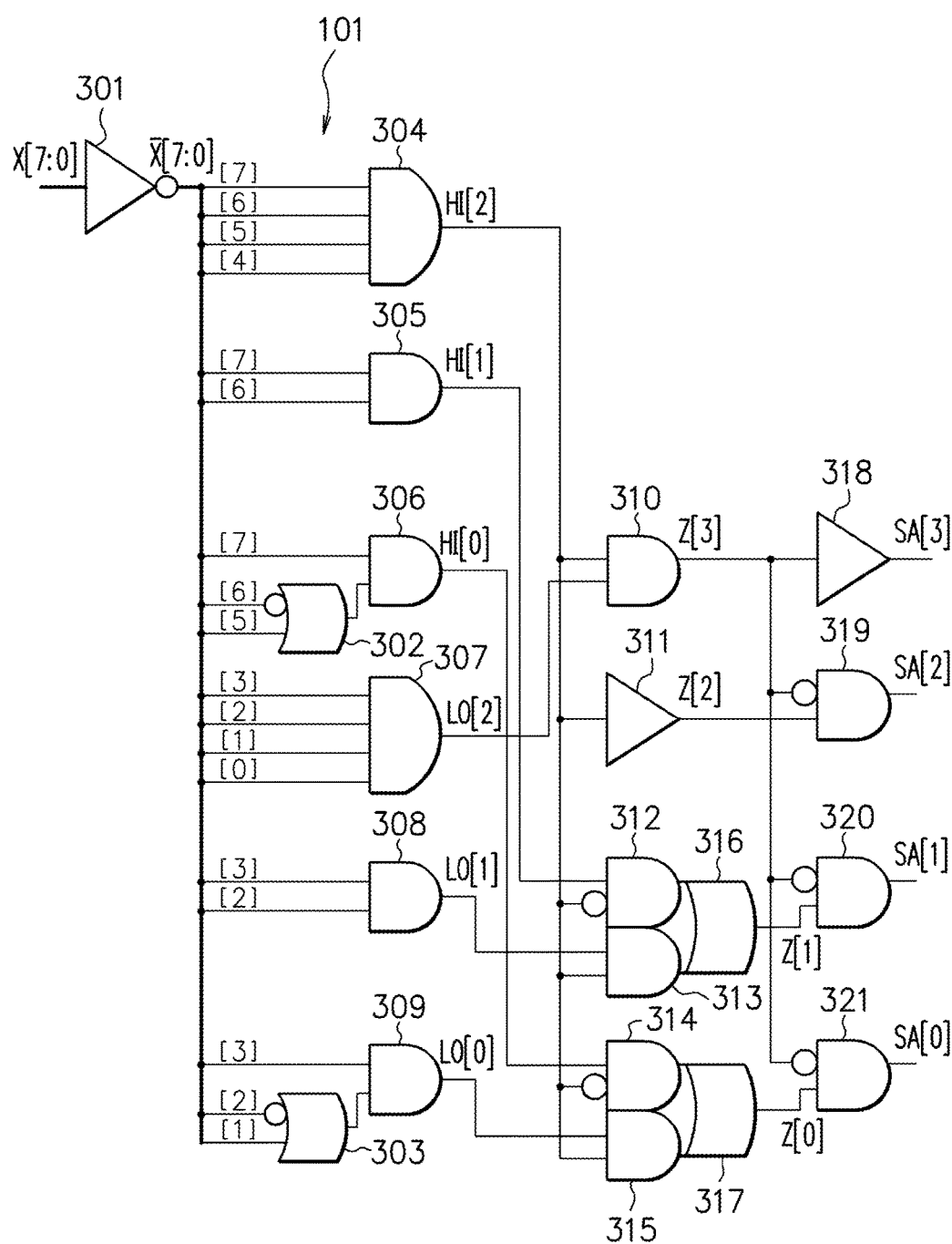
FIG. 3 is a circuit diagram illustrating a configuration example of a leading zero count unit in FIG. 1.

FIG. 3 is a circuit diagram illustrating a configuration example of the leading zero count unit 101 in FIG. 1. An inverter 301 outputs an 8-bit binary number /X[7:0] resulting from the logical inversion of the first operand X[7:0]. A logical product operation circuit 304, which is a 4-input AND circuit, outputs the result of a logical product operation on the four bits /X[7], /X[6], /X[5], and /X[4], as a bit HI[2]. A logical product operation circuit 305, which is a 2-input AND circuit, outputs the result of a logical product operation on the two bits /X[7] and /X[6], as a bit HI[1]. A logical sum operation circuit 302, which is a 2-input OR circuit, outputs the result of a logical sum operation on the two bits X[6] and /X[5]. A logical product operation circuit 306, which is a 2-input AND circuit, outputs the result of a logical product operation on the bit /X[7] and the output bit of the logical sum operation circuit 302, as a bit HI[0].

A logical product operation circuit 307, which is a 4-input AND circuit, outputs the result of a logical product operation on the four bits /X[3], /X[2], /X[1], and /X[0], as a bit LO[2]. A logical product operation circuit 308, which is a 2-input AND circuit, outputs the result of a logical product operation on the two bits /X[3] and /X[2], as a bit LO[1]. A logical sum operation circuit 303, which is a 2-input OR circuit, outputs the result of a logical sum operation on the two bits X[2] and /X[1]. A logical product operation circuit 309, which is a 2-input AND circuit, outputs the result of a logical product operation on the bit /X[3] and the output bit of the logical sum operation circuit 303, as a bit LO[0].

A logical product operation circuit 310, which is a 2-input AND circuit, outputs the result of a logical product operation on the bit HI[2] and the bit LO[2], as a bit Z[3]. A buffer 311 outputs a bit Z[2] having the same logic value as that of the bit HI[2].

A logical product operation circuit 312, which is a 2-input AND circuit, outputs the result of a logical product operation on the bit HI[1] and a logically inverted bit of the bit HI[2]. A logical product operation circuit 313, which is a 2-input AND circuit, outputs the result of a logical product operation on the bit LO[1] and the bit HI[2]. A logical sum operation circuit 316, which is a 2-input OR circuit, outputs the result of a logical sum operation on the output bit of the logical product operation circuit 312 and the output bit of the logical product operation circuit 313, as a bit Z[1].

A logical product operation circuit 314, which is a 2-input AND circuit, outputs the result of a logical product operation on the bit HI[0] and a logically inverted bit of the bit HI[2]. A logical product operation circuit 315, which is a 2-input AND circuit, outputs the result of a logical product operation on the bit LO[0] and the bit HI[2]. A logical sum operation circuit 317, which is a 2-input OR circuit, outputs the result of a logical sum operation on the output bit of the logical product operation circuit 314 and the output bit of the logical product operation circuit 315, as a bit Z[0].

A buffer 318 outputs the bit SA[3] having the same logic value as that of the bit Z[3]. A logical product operation circuit 319, which is a 2-input AND circuit, outputs the result of a logical product operation on a logically inverted bit of the bit Z[3] and the bit Z[2], as the bit SA[2]. A logical product operation circuit 320, which is a 2-input AND circuit, outputs the result of a logical product operation on the logically inverted bit of the bit Z[3] and the bit Z[1], as the bit SA[1]. A logical product operation circuit 321, which is a 2-input AND circuit, outputs the result of a logical product operation on the logically inverted bit of the bit Z[3] and the bit Z[0], as the bit SA[0]. As described above, the leading zero count unit 101 receives the 8-bit first operand X[7:0] and outputs the 4-bit leading zero count value SA[3:0].

FIG. 4 is a circuit diagram illustrating a configuration example of the right shift unit 102 in FIG. 1. A logical product operation circuit 401, which is a 4-input AND circuit, outputs the result of a logical product operation on logically inverted bits of the four bits SA[3], SA[2], SA[1], and SA[0], as a bit D[0]. A logical product operation circuit 402, which is a 4-input AND circuit, outputs the result of a logical product operation on the logically inverted bits of the three bits SA[3], SA[2], and SA[1] and the bit SA[0], as a bit D[1]. A logical product operation circuit 403, which is a 4-input AND circuit, outputs the result of a logical product operation on the logically inverted bits of the three bits SA[3], SA[2], and SA[0] and the bit SA[1], as a bit D]2]. A logical product operation circuit 404, which is a 4-input AND circuit, outputs the result of a logical product operation on the logically inverted bits of the two bits SA[3] and SA[2], the bit SA[1], and the bit SA[0], as a bit D[3].

A logical product operation circuit 405, which is a 4-input AND circuit, outputs the result of a logical product operation on the logically inverted bits of the three bits SA[3], SA[1], and SA[0] and the bit SA[2], as a bit D[4]. A logical product operation circuit 406, which is a 4-input AND circuit, outputs the result of a logical product operation on the logically inverted bits of the two bits SA[3] and SA[1], the bit SA[2], and the bit SA[0], as a bit D[5]. A logical product operation circuit 407, which is a 4-input AND circuit, outputs the result of a logical product operation on the logically inverted bits of the two bits SA[3] and SA[0], the bit SA[2], and the bit SA[1], as a bit D[6]. A logical product operation circuit 408, which is a 4-input AND circuit, outputs the result of a logical product operation on the logically inverted bit of the bit SA[3], the bit SA[2], the bit SA[1], and the bit SA[0], as a bit D[7].

A buffer 409 outputs the bit SB[7] having the same logic value as that of the bit D[0]. A logical sum operation circuit 410, which is a 2-input OR circuit, outputs the result of a logical sum operation on the two bits D[0] and D[1], as the bit SB[6]. A logical sum operation circuit 411, which is a 3-input OR circuit, outputs the result of a logical sum operation on the three bits D[0], D[1], and D[2], as the bit SB[5]. A logical sum operation circuit 412, which is a 4-input OR circuit, outputs the result of a logical sum operation on the four bits D[0], D[1], D[2], and D[3], as the bit SB[4].

A logical sum operation circuit 413, which is a 5-input OR circuit, outputs the result of a logical sum operation on the five bits D[0], D[1], D[2], D[3], and D[4], as the bit SB[3]. A logical sum operation circuit 414, which is a 6-input OR circuit, outputs the result of a logical sum operation on the six bits D[0], D[1], D[2], D[3], D[4], and D[5], as the bit SB[2]. A logical sum operation circuit 415, which is a 7-input OR circuit, outputs the result of a logical sum operation on the seven bits D[0], D[1], D[2], D[3], D[4], D[5], and D[6], as the bit SB[1]. A logical sum operation circuit 416, which is an 8-input OR circuit, outputs the result of a logical sum operation on the eight bits D[0], D[1], D[2], D[3], D[4], D[5], D[6], and D[7], as the bit SB[0].

As described above, the right shift unit 102 receives the 4-bit leading zero count value SA[3:0] and outputs the 8-bit binary number SB[7:0] resulting from right-shifting the 8-bit constant "1111_1111" by the leading zero count value SA[3:0].

Figure 5:
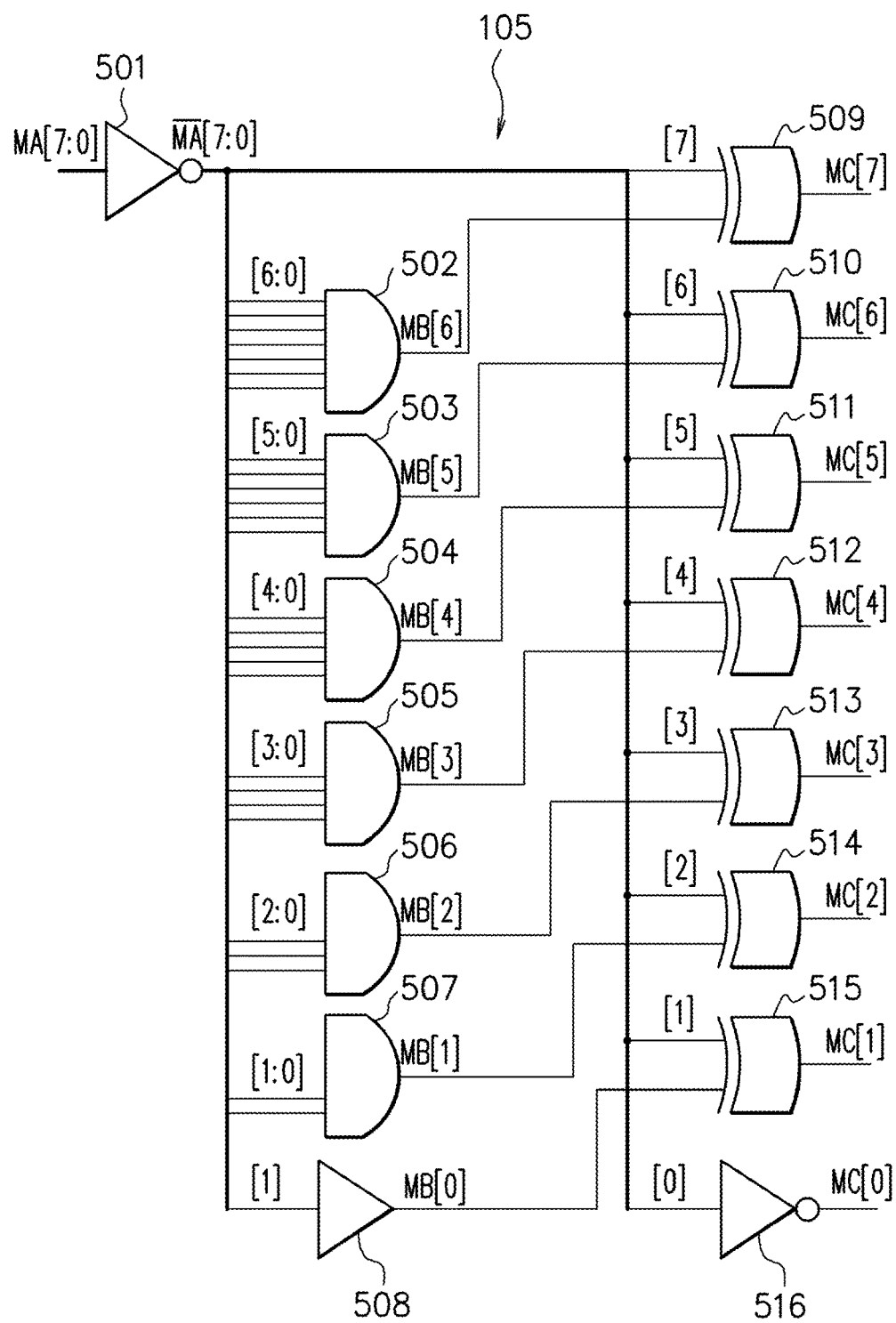
FIG. 5 is a circuit diagram illustrating a configuration example of a complement processing unit in FIG. 1.

FIG. 5 is a circuit diagram illustrating a configuration example of the complement processing unit 105 in FIG. 1. An inverter 501 outputs an 8-bit binary number /MA[7:0] resulting from the logical inversion of the 8-bit binary number MA[7:0]. A logical product operation circuit 502, which is a 7-input AND circuit, outputs the result of a logical product operation on the seven bits /MA[6], /MA[5], /MA[4], /MA[3], /MA[2], /MA[1], and /MA[0], as a bit MB[6]. A logical product operation circuit 503, which is a 6-input AND circuit, outputs the result of a logical product operation on the six bits /MA[5], /MA[4], /MA[3], /MA[2], /MA[1], and /MA[0], as a bit MB[5]. A logical product operation circuit 504, which is a 5-input AND circuit, outputs the result of a logical product operation on the five bits /MA[4], /MA[3], /MA[2], /MA[1], and /MA[0], as a bit MB[4].

A logical product operation circuit 505, which is a 4-input AND circuit, outputs the result of a logical product operation on the four bits /MA[3], /MA[2], /MA[1], and /MA[0], as a bit MB[3]. A logical product operation circuit 506, which is a 3-input AND circuit, outputs the result of a logical product operation on the three bits /MA[2], /MA[1], and /MA[0], as a bit MB[2]. A logical product operation circuit 507, which is a 2-input AND circuit, outputs the result of a logical product operation on the two bits /MA[1] and /MA[0], as a bit MB[1]. A buffer 508 outputs a bit MB[0] having the same logic value as that of the bit /MA[1].

An exclusive logical sum operation circuit 509, which is a 2-input EOR circuit, outputs the result of an exclusive logical sum operation on the bit /MA[7] and the bit MB[6], as the bit MC[7]. An exclusive logical sum operation circuit 510, which is a 2-input EOR circuit, outputs the result of an exclusive logical sum operation on the bit /MA[6] and the bit MB[5], as the bit MC[6]. An exclusive logical sum operation circuit 511, which is a 2-input EOR circuit, outputs the result of an exclusive logical sum operation on the bit /MA[5] and the bit MB[4], as the bit MC[5]. An exclusive logical sum operation circuit 512, which is a 2-input EOR circuit, outputs the result of an exclusive logical sum operation on the bit /MA[4] and the bit MB[3], as the bit MC[4]. An exclusive logical sum operation circuit 513, which is a 2-input EOR circuit, outputs the result of an exclusive logical sum operation on the bit /MA[3] and the bit MB[2], as the bit MC[3]. An exclusive logical sum operation circuit 514, which is a 2-input EOR circuit, outputs the result of an exclusive logical sum operation on the bit /MA[2] and the bit MB[1], as the bit MC[2]. An exclusive logical sum operation circuit 515, which is a 2-input EOR circuit, outputs the result of an exclusive logical sum operation on the bit /MA[1] and the bit MB[0], as the bit MC[1]. An inverter 516 outputs a logically inverted bit of the bit /MA[0] as the bit MC[0]. As described above, the complement processing unit 105 receives the 8-bit binary number MA[7:0] and outputs the 8-bit binary number MC [7:0] resulting from adding 1 to the logically inverted value of the binary number MA[7:0].

The processing circuit 100 successively executes all the steps in FIG. 2 and thus has problems of a low processing speed and an increase in its area. An increase in the processing speed and a reduction in the area are required of the processing circuit 100. Hereinafter, a processing circuit having a small area and capable of calculating the output value R[7:0] at a high speed will be described.

FIG. 6 is a diagram illustrating a configuration example of a processing circuit 600 according to a first embodiment. As illustrated in, for example, FIG. 7, the processing circuit 600, similarly to the processing circuit 100, receives a first operand X[m:0] composed of a plurality of bits and a second operand Y[m:0] composed of a plurality of bits, and with a digit of the most significant 1-valued bit in the first operand X[m:0] composed of the plural bits being defined as a first bit digit (for example, X[2]) and with a digit of a bit having 1 first in a higher-order direction than the first bit digit in the second operand Y[m:0] composed of the plural bits being defined as a second bit digit (for example, Y[4]), the processing circuit 600 outputs an output value R[m:0] composed of a plurality of bits out of which a bit (for example, R[4]) corresponding to the second bit digit is 1 and the other bits (for example, R[0] to R[3] and R[5] to R[7]) are 0. The first operand X[m:0], the second operand Y[m:0], and the output value R[m:0] are each a binary number composed of m+1 bits. Here, m is a natural number and is, for example, 7.

The processing circuit 600 includes a high-order mask processing unit 601, a low-order mask processing unit 602, and an output synthesizing unit 603, and receives the first operand X[m:0] composed of the m+1 bits and the second operand Y[m:0] composed of the m+1 bits to output the output value R[m:0] composed of the m+1 bits.

The high-order mask processing unit 601 receives the first operand X[m−1:0] and the second operand Y[m−1:0], and outputs a high-order mask binary number C[m−1:0] composed of a plurality of bits out of which, as illustrated in FIG. 7, a bit (for example, C[3]) corresponding to the second bit digit is 1 and higher-order bits (for example, C[4] to C[6]) than the bit corresponding to the second bit digit are 0. Specifically, the high-order mask processing unit 601 receives the low-order m bits X [m−1:0] in the first operand X[m:0] composed of the m+1 bits and the low-order m bits Y[m−1:0] in the second operand Y[m:0] composed of the m+1 bits and outputs the high-order mask binary number C[m−1:0] composed of m bits.

The low-order mask processing unit 602 receives the first operand X[m:0] and the second operand Y[m:0] and outputs a low-order mask binary number H[m:0] composed of a plurality of bits out of which, as illustrated in, for example, FIG. 7, a bit (for example, H[4]) corresponding to the second bit digit is 1 and lower-order bits (for example, H[0] to H[3]) than the bit corresponding to the second bit digit are 0. Specifically, the low-order mask processing unit 602 receives the first operand X[m:0] composed of the m+1 bits and the second operand Y[m:0] composed of the m+1 bits and outputs the low-order mask binary number H[m:0] composed of m+1 bits.

The output synthesizing unit 603 receives the high-order mask binary number C[m−1:0] composed of the m bits and the low-order mask binary number H[m:0] composed of the m+1 bits and outputs the output value R[m:0] composed of the m+1 bits out of which the bit (for example, R[4]) corresponding to the second bit digit is 1 and the other bits (for example, R[0] to R[3] and R[5] to R[7]) are 0.

Here, a bit C[−1] in FIG. 7 is a constant that is 1. A digit of the high-order mask bit C[−1] corresponds to a digit of the low-order mask bit H[0]. Digits of the high-order mask bits C[0] to C[6] correspond to digits of the low-order mask bits H[1] to H[7]. As illustrated in FIG. 7, the output synthesizing unit 603 outputs the output values R[0] to R[m] which are the results of bit-digit-wise logical product operations on the m+1-bit high-order mask binary numbers C[−1] to C[m−1] and the m+1-bit low-order mask binary numbers H[0] to H[m]. Hereinafter, an example where m is 7 will be described.

Figure 8:
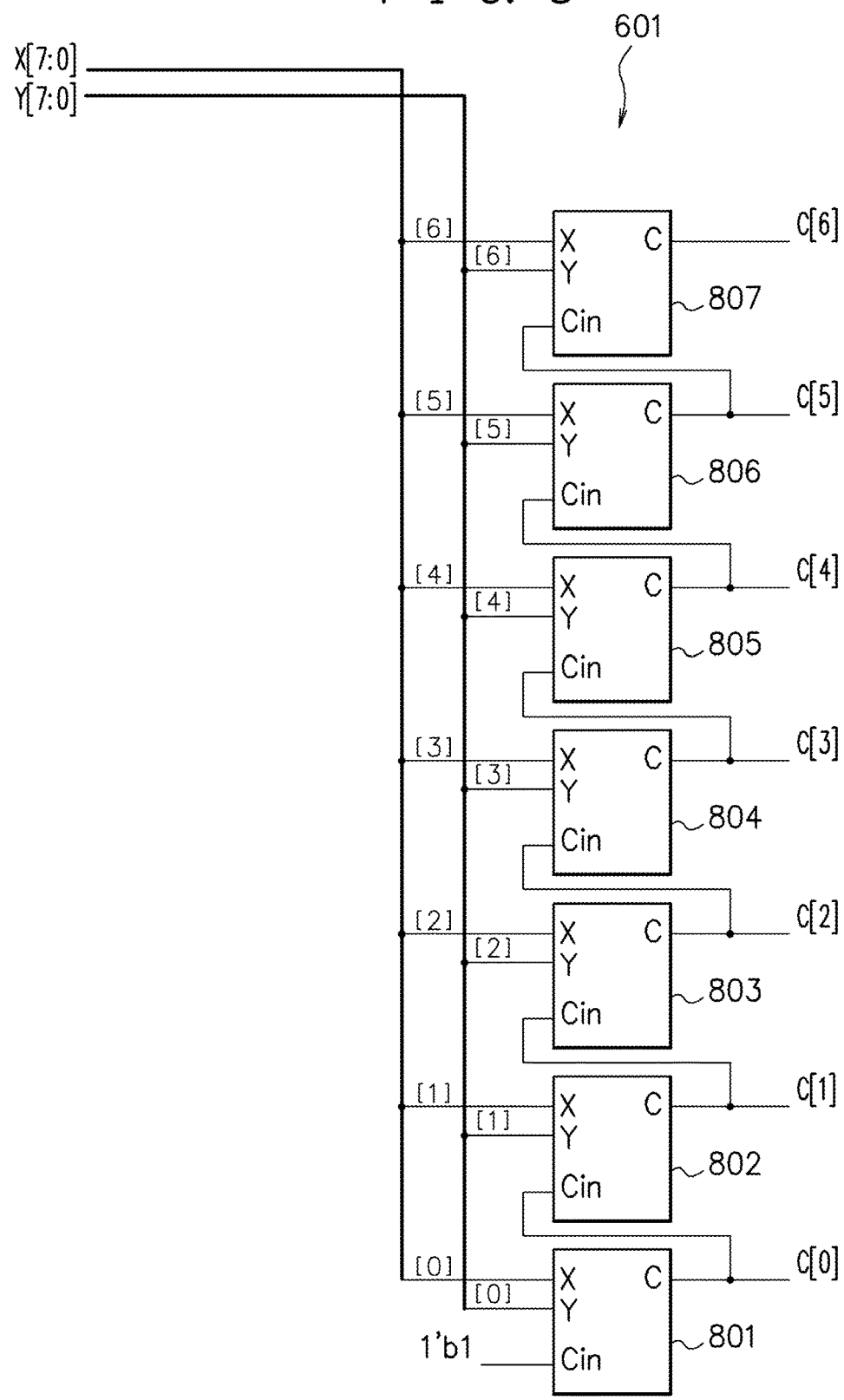
FIG. 8 is a diagram illustrating a configuration example of a high-order mask processing unit in FIG. 6.

FIG. 8 is a diagram illustrating a configuration example of the high-order mask processing unit 601 in FIG. 6. The high-order mask processing unit 601 includes a plurality of carry generating units 801 to 807. The plural carry generating units 801 to 807, which have the same configuration illustrated in FIG. 9 to be described later, each perform an operation for each bit group of the first operand X[6:0] and the second operand Y[6:0] and they generate their own carry bits C[0] to C[6] respectively. The plural carry generating units 802 to 807 each perform the operation based on the bit group of the first operand X[6:1] and the second operand Y[6:1] and the carry bit C[0] to C[5] generated by the carry generating unit 801 to 806 corresponding to a lower-order bit.

The carry generating unit 801 receives the bit X[0] at its input terminal X, receives the bit Y[0] at its input terminal Y, and receives 1 at its input terminal Cin to output its carry bit C[0] from its output terminal C. The carry generating unit 802 receives the bit X[1] at its input terminal X, receives the bit Y[1] at its input terminal Y, and receives the carry bit C[0] from the lower-order carry generating unit 801 at its input terminal Cin to output its carry bit C[1] from its output terminal C. The carry generating unit 803 receives the bit X[2] at its input terminal X, receives the bit Y[2] at its input terminal Y, and receives the carry bit C[1] from the lower-order carry generating unit 802 at its input terminal Cin to output its carry bit C[2] from its output terminal C. The carry generating unit 804 receives the bit X[3] at its input terminal X, receives the bit Y[3] at its input terminal Y, and receives the carry bit C[2] from the lower-order carry generating unit 803 at its input terminal Cin to output its carry bit C[3] from its output terminal C. The carry generating unit 805 receives the bit X[4] at its input terminal X, receives the bit Y[4] at its input terminal Y, and receives the carry bit C[3] from the lower-order carry generating unit 804 at its input terminal Cin to output its carry bit C[4] from its output terminal C. The carry generating unit 806 receives the bit X[5] at its input terminal X, receives the bit Y[5] at its input terminal Y, and receives the carry bit C[4] from the lower-order carry generating unit 805 at its input terminal Cin to output its carry bit C[5] from its output terminal C. The carry generating unit 807 receives the bit X[6] at its input terminal X, receives the bit Y[6] at its input terminal Y, and receive the carry bit C[5] from the lower-order carry generating unit 806 at its input terminal Cin to output its carry bit C[6] from its output terminal C.

As described above, the plural carry generating units 802 to 807 receive bits at the same digit of the first operand X[6:1] and the second operand Y[6:1] on a bit digit-by-bit digit basis and receive the carry bits C[0] to C[5] generated by the carry generating units 801 to 806 corresponding to lower-order bits, and output their carry bits C[1] to C[6]. The high-order mask processing unit 601 outputs the carry bits C[0] to C[6] as the high-order mask binary number C[6:0].

Figure 9:
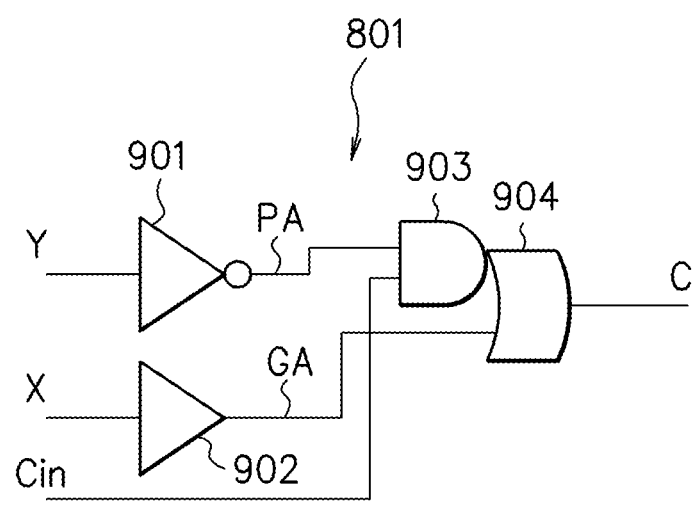
FIG. 9 is a circuit diagram illustrating a configuration example of a carry generating unit in FIG. 8.

FIG. 9 is a circuit diagram illustrating a configuration example of the carry generating unit 801 in FIG. 8. The carry generating units 802 to 807 in FIG. 8 also have the same configuration as that of the carry generating unit 801. The carry generating units 801 to 807 each include an inverter 901, a buffer 902, a logical product operation circuit 903, a logical sum operation circuit 904, the input terminals Y, X, Cin, and the output terminal C. The inverter 901 outputs a logically inverted bit PA of the bit of the input terminal Y. The buffer 902 outputs a bit GA having the same logic value as that of the bit of the input terminal X. The logical product operation circuit 903, which is a 2-input AND circuit, outputs the result of a logical product operation on the bit PA and the carry bit of the input terminal Cin. The logical sum operation circuit 904, which is a 2-input OR circuit, performs a logical sum operation on the output bit of the logical product operation circuit 903 and the bit GA to output its carry bit to the output terminal C.

Figure 10:
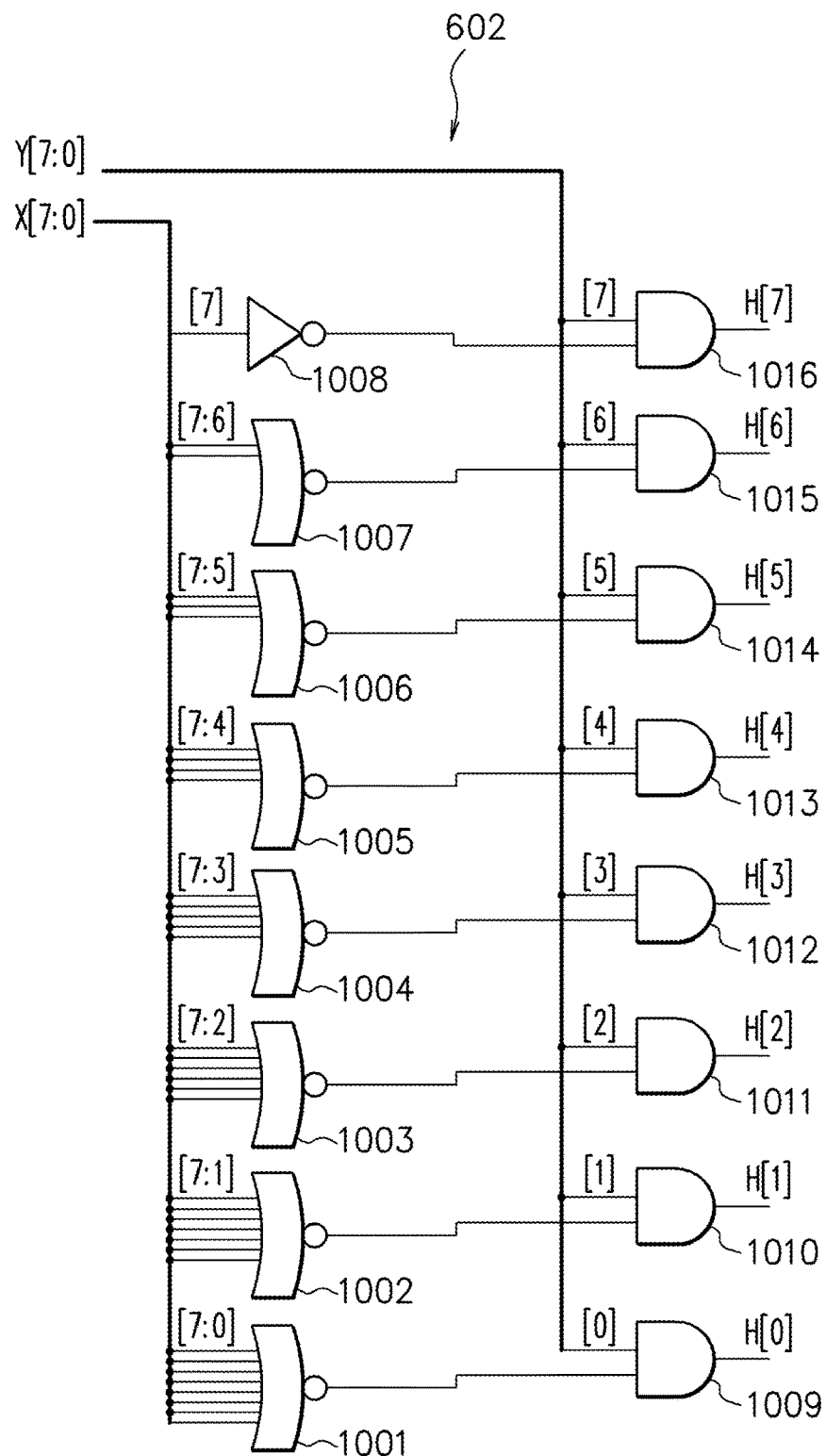
FIG. 10 is a circuit diagram illustrating a configuration example of a low-order mask processing unit in FIG. 6.

FIG. 10 is a circuit diagram illustrating a configuration example of the low-order mask processing unit 602 in FIG. 6. The low-order mask processing unit 602 includes a plurality of negative logical sum operation circuits 1001 to 1007, an inverter 1008, and a plurality of logical product operation circuits 1009 to 1016.

The negative logical sum operation circuit 1001, which is an 8-input NOR circuit, outputs the result of a negative logical sum operation on the 8-bit X[7:0]. The negative logical sum operation circuit 1002, which is a 7-input NOR circuit, outputs the result of a negative logical sum operation on the 7-bit X[7:1]. The negative logical sum operation circuit 1003, which is a 6-input NOR circuit, outputs the result of a negative logical sum operation on the 6-bit X[7:2]. The negative logical sum operation circuit 1004, which is a 5-input NOR circuit, outputs the result of a negative logical sum operation on the 5-bit X[7:3]. The negative logical sum operation circuit 1005, which is a 4-input NOR circuit, outputs the result of a negative logical sum operation on the 4-bit X[7:4]. The negative logical sum operation circuit 1006, which is a 3-input NOR circuit, outputs the result of a negative logical sum operation on the 3-bit X[7:5]. The negative logical sum operation circuit 1007, which is a 2-input NOR circuit, outputs the result of a negative logical sum operation on the 2-bit X[7:6]. The inverter 1008 outputs a logically inverted bit of the bit X[7].

The logical product operation circuit 1009, which is a 2-input AND circuit, outputs the result of a logical product operation on the output bit of the negative logical sum operation circuit 1001 and the bit Y[0], as the bit H[0]. The logical product operation circuit 1010, which is a 2-input AND circuit, outputs the result of a logical product operation on the output bit of the negative logical sum operation circuit 1002 and the bit Y[1], as the bit H[1]. The logical product operation circuit 1011, which is a 2-input AND circuit, outputs the result of a logical product operation on the output bit of the negative logical sum operation circuit 1003 and the bit Y[2], as the bit H[2]. The logical product operation circuit 1012, which is a 2-input AND circuit, outputs the result of a logical product operation on the output bit of the negative logical sum operation circuit 1004 and the bit Y[3], as the bit H[3]. The logical product operation circuit 1013, which is a 2-input AND circuit, outputs the result of a logical product operation on the output bit of the negative logical sum operation circuit 1005 and the bit Y[4], as the bit H[4]. The logical product operation circuit 1014, which is a 2-input AND circuit, outputs the result of a logical product operation on the output bit of the negative logical sum operation circuit 1006 and the bit Y[5], as the bit H[5]. The logical product operation circuit 1015, which is a 2-input AND circuit, outputs the result of a logical product operation on the output bit of the negative logical sum operation circuit 1007 and the bit Y[6], as the bit H[6]. The logical product operation circuit 1016, which is a 2-input AND circuit, outputs the result of a logical product operation on the output bit of the inverter 1008 and the bit Y[7], as the bit H[7]. The low-order mask processing unit 602 outputs the bits H[0] to H[7] as the low-order mask binary number H[7:0].

As described above, the negative logical sum operation circuits 1001 to 1007 perform the negative logical sum operations on the bits in the plural combinations out of the m+1 bits of the first operand X[m:0]. The logical product operation circuits 1009 to 1015 perform the logical product operations on the results of the negative logical sum operations by the negative logical sum operation circuits 1001 to 1007 and the second operand Y[m−1:0] respectively.

Figure 11:
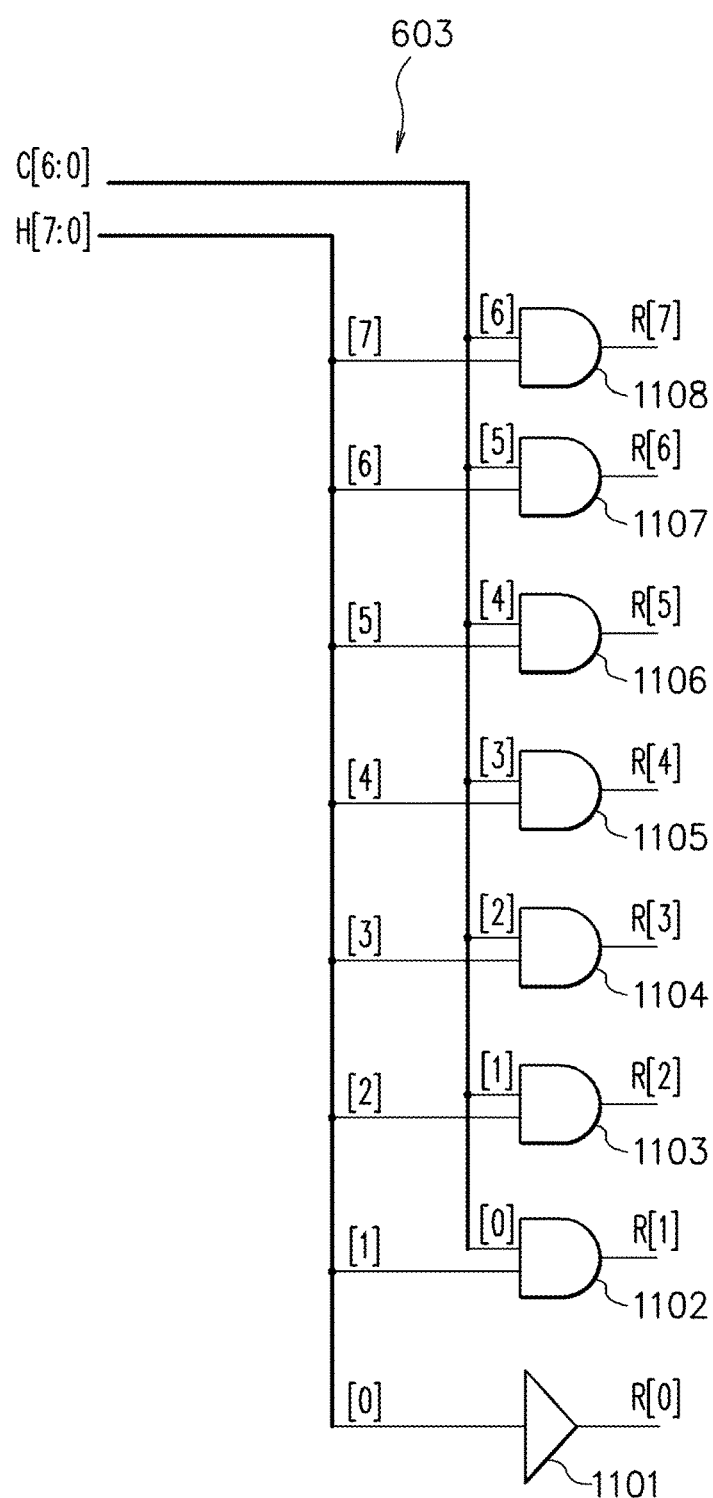
FIG. 11 is a circuit diagram illustrating a configuration example of an output synthesizing unit in FIG. 6.

FIG. 11 is a circuit diagram illustrating a configuration example of the output synthesizing unit 603 in FIG. 6. The output synthesizing unit 603 includes a buffer 1101 and a plurality of logical product operation circuits 1102 to 1108. The buffer 1101 outputs the bit R[0] having the same logic value as that of the bit H[0]. The logical product operation circuit 1102, which is a 2-input AND circuit, outputs the result of a logical product operation on the bits C[0] and H[1], as the bit R[1]. The logical product operation circuit 1103, which is a 2-input AND circuit, outputs the result of a logical product operation on the bits C[1] and H[2], as the bit R[2]. The logical product operation circuit 1104, which is a 2-input AND circuit, outputs the result of a logical product operation on the bits C[2] and H[3], as the bit R[3]. The logical product operation circuit 1105, which is a 2-input AND circuit, outputs the result of a logical product operation on the bits C[3] and H[4], as the bit R[4]. The logical product operation circuit 1106, which is a 2-input AND circuit, outputs the result of a logical product operation on the bits C[4] and H[5], as the bit R[5]. The logical product operation circuit 1107, which is a 2-input AND circuit, outputs the result of a logical product operation on the bits C[5] and H[6], as the bit R[6]. The logical product operation circuit 1108, which is a 2-input AND circuit, outputs the result of a logical product operation on the bits C[6] and H[7], as the bit R[7].

Incidentally, the buffer 1101 may be replaced by a logical product operation circuit which outputs the result of a logical product operation on the bit H[0] and the bit C[−1], as the bit R[0] as in FIG. 7. Here, the bit C[−1] is a constant that is 1. The output synthesizing unit 603 outputs the bits R[0] to R[7] as the output value R[7:0].

As described above, the logical product operation circuits 1102 to 1108 perform the logical product operations on the high-order m bits H[m:1] in the low-order mask binary number H[m:0] composed of the m+1 bits and the high-order mask binary number C[m−1:0] composed of the m bits, and output the high-order m bits R[m:1] in the output value R[m:0] composed of the m+1 bits. The buffer 1101 outputs the least significant bit H[0] in the low-order mask binary number H[m:0] as the least significant bit R[0] of the output value R[m:0].

As illustrated in FIG. 7, in the low-order mask binary number H[7:0], the bit (for example, H[4]) corresponding to the second bit digit is 1 and the lower-order bits (for example, H[0] to H[3]) than the bit corresponding to the second bit digit are masked to 0. In the high-order mask binary number C[6:0], the bit (for example, C[3]) corresponding to the second bit digit is 1, and the higher-order bits (for example, C[4] to C[6]) than the bit corresponding to the second bit digit are masked to 0. Since the low-order mask binary number H[7:0] and the high-order mask binary number C[6:0] are not in a mutually dependent relation, the parallel operation by the low-order mask processing unit 602 and the high-order mask processing unit 601 is possible.

As illustrated in FIG. 8, when obtaining the bits C[1] to C[6] at the respective digits of the high-order mask binary number C[6:0], the high-order mask processing unit 601 uses C[0] to C[5] at the lower-order digits of the high-order mask binary number C[6:0], enabling the simplification of its arithmetic expressions. Consequently, an arithmetic circuit can be made common and can be configured with a small area. The processing circuit 600 in FIG. 6 is smaller in area and is capable of calculating the output value R[m:0] faster than the processing circuit 100 in FIG. 1.

The following describes a reason why the processing circuit 600 in FIG. 6 is capable of outputting the same output value R[m:0] as that of the processing circuit 100 in FIG. 1. The first operand X[m:0] and the second operand Y[m:0] are each composed of m+1 bits. As is seen in the carry generating unit 801 in FIG. 9, GA[n] and PA[n] in the following expressions hold. Here, n is an integer equal to or more than 0.

$$GA[n]=X[n]$$

$$PA[n]=\overline{Y[n]}$$  [expression 1]

Further, C[n] in the following expression holds as is seen in the high-order mask processing unit 601 in FIG. 8, H[n] in the following expression holds as is seen in the low-order mask processing unit 602 in FIG. 10, and R[n] in the following expression holds as is seen in the output synthesizing unit 603 in FIG. 11. Here, "|" represents a logical sum operation, and "&" represents a logical product operation.

$$C[n]=GA[n]|(PA[n]\& C[n-1])$$

$$C[-1]=1$$

$$H[n]=\overline{(|X[m:n])}\&Y[n]$$

$$R[n]=H[n]\& C[n-1]$$  [expression 2]

The following proves that the aforesaid arithmetic expressions of the processing circuit 600 can be derived from the following arithmetic expressions of the processing circuit 100. The binary number /SB[n] at Step S204 in FIG. 2 is expressed by the following expression since 1 continues up to a digit corresponding to the most significant 1-valued bit in the first operand X[m:0], and thereafter 0 follows. Further, as is seen at Step S205 in FIG. 2, the binary number MA[n] is expressed by the following expression.

$$\overline{SB[n]}=\overline{(|X[m:n])}$$

$$MA[n]=Y[n]\ \&\ \overline{SB[n]}.$$  [expression 3]

Further, as is seen at Steps S206 and S207 in FIG. 2, the output value R[n] is expressed by the following expression.

$$R[n]=\text{if } (n==0)\{MA[n]\}$$

$$\text{else}\{MA[n]\&(\overline{|MA[n-1:0]})\}$$  [expression 4]

R[n] in the above expression is expressed by R[0] to R[m] in the following expressions.

[expression 5]

$$R[m] = (Y[m]\ \&(\overline{|X[m:m]}))\ \&$$
$$\overline{(Y[m-1]\ \&(\overline{|X[m:m-1]}))\ \&\ \ldots\ \&(Y[0]\ \&(\overline{|X[m:0]}))}$$
$$\ldots$$
$$R[2] = (Y[2]\ \&(\overline{|X[m:2]}))\ \&\overline{(Y[1]\ \&(\overline{|X[m:1]}))}\ \&\overline{(Y[0]\ \&(\overline{|X[m:0]}))}$$
$$R[1] = (Y[1]\ \&(\overline{|X[m:1]}))\ \&\overline{(Y[0]\ \&(\overline{|X[m:0]}))}$$
$$R[0] = (Y[0]\ \&(\overline{|X[m:0]}))$$

Next, organizing negative portions in the R[0] to R[m] of the above expressions gives the following transformed expressions.

[expression 6]

$$R[m] = (Y[m]\ \&(\overline{|X[m:m]}))\ \&$$
$$(\overline{Y[m-1]}(|X[m:m-1]))\ \&\ \ldots\ \&(\overline{Y[0]}(|X[m:0]))$$
$$\ldots$$
$$R[2] = (Y[2]\ \&(\overline{|X[m:2]}))\ \&(\overline{Y[1]}(|X[m:1]))\ \&(\overline{Y[0]}(|X[m:0]))$$
$$R[1] = (Y[1]\ \&(\overline{|X[m:1]}))\ \&(\overline{Y[0]}(|X[m:0]))$$
$$R[0] = (Y[0]\ \&(\overline{|X[m:0]}))$$

Next, eliminating non-existent cases in R[0] to R[m] of the above expressions gives the following transformed expressions.

[expression 7]

$$R[m] = \left(Y[m] \& (\overline{|X[m:m]})\right) \& \left(\overline{Y[m-1]}(|X[m-1:m-1])\right) \& \ldots \& \left(\overline{Y[0]}(|X[m-1:0])\right)$$

$$\ldots$$

$$R[2] = \left(Y[2] \& (\overline{|X[m:2]})\right) \& \left(\overline{Y[1]}(|X[1])\right) \& \left(\overline{Y[0]}(|X[1:0])\right)$$

$$R[1] = \left(Y[1] \& (\overline{|X[m:1]})\right) \& \left(\overline{Y[0]}(|X[0])\right)$$

$$R[0] = \left(Y[0] \& (\overline{|X[m:0]})\right)$$

Next, expanding R[0] to R[m] of the above expressions gives the following transformed expressions.

[expression 8]

$$R[m] = \frac{\left(Y[m] \& (\overline{|X[m:m]})\right) \& (\overline{Y[m-1]}|X[m-1]) \& \ldots \&}{(\overline{Y[1]}|\overline{Y[0]}|Y[1]|X[1]|\overline{Y[1]}|X[0]|\overline{Y[0]}|X[1]|X[1]|X[1]|X[0])}$$

$$\ldots$$

$$R[2] = \frac{\left(Y[2] \& (\overline{|X[m:2]})\right) \&}{(\overline{Y[1]}|\overline{Y[0]}|Y[1]|X[1]|\overline{Y[1]}|X[0]|\overline{Y[0]}|X[1]|X[1]|X[1]|X[0])}$$

$$R[1] = \left(Y[1] \& (\overline{|X[m:1]})\right) \& \left(\overline{Y[0]}(|X[0])\right)$$

$$R[0] = \left(Y[0] \& (\overline{|X[m:0]})\right)$$

Next, eliminating overlapping portions and non-existent cases in R[0] to R[m] in the above expressions gives the following transformed expressions.

[expression 9]

$$R[m] = \begin{array}{l}\left(Y[m] \& (\overline{|X[m:m]})\right) \& (X[m-1]|(\overline{Y[m-1]} \& \\ X[m-2])|(\overline{Y[m-1]} \& \overline{Y[m-2]} \& X[m-3])) \\ |\ldots|(\overline{Y[m-1]} \& \overline{Y[m-2]} \& \ldots \& Y[0])\end{array}$$

$$\ldots$$

$$R[2] = \left(Y[2] \& (\overline{|X[m:2]})\right) \& (X[1]|(\overline{Y[1]} \& \overline{Y[0]})|(\overline{Y[1]} \& X[0]))$$

$$R[1] = \left(Y[1] \& (\overline{|X[m:1]})\right) \& (\overline{Y[0]}|X[0])$$

$$R[0] = \left(Y[0] \& (\overline{|X[m:0]})\right)$$

Next, if R[0] to R[m] of the above expressions are transformed so as to use lower-order carry bits (for example, final terms of R[1] and [R2]), the following expressions hold. These carry bits correspond to the carry bits C[0] to C[6] in FIG. 8. The point of this embodiment lies in that the low-order carry bits are made usable in the generation of the carry bits.

[expression 10]

$$R[m] = \begin{array}{l}\left(Y[m] \& (\overline{|X[m:m]})\right) \& (X[m-1](\overline{Y[m-1]} \& \\ (X[m-2]|\overline{Y[m-2]} \& X[m-3]|\ldots||\overline{Y[m-2]} \& \ldots \& Y[0])))\end{array}$$

$$\ldots$$

$$R[2] = \left(Y[2] \& (\overline{|X[m:2]})\right) \& (X[1]|(\overline{Y[1]} \& (\overline{Y[0]}|X[0])))$$

$$R[1] = \left(Y[1] \& (\overline{|X[m:1]})\right) \& (\overline{Y[0]}|X[0])$$

$$R[0] = \left(Y[0] \& (\overline{|X[m:0]})\right)$$

Next, breaking down R[0] to R[m] of the above expressions gives the following expressions. It is seen that the following expressions correspond to the processing circuit 600 in FIG. 6. From the above, it is proved that the arithmetic expressions of the processing circuit 600 can be derived from the arithmetic expressions of the processing circuit 100.

[expression 11]

$$GA[m] = X[m]$$
$$PA[m] = \overline{Y[m]}$$
$$H[m] = (\overline{|X[m]}) \& Y[m]$$
$$C[m] = GA[m]|(PA[m] \& C[m-1])$$
$$R[m] = H[m] \& C[m-1]$$

$$\ldots$$

$$GA[2] = X[2]$$
$$PA[2] = \overline{Y[2]}$$
$$H[2] = (\overline{|X[m:2]}) \& Y[2]$$
$$C[2] = GA[2]|(PA[2] \& C[1])$$
$$R[2] = H[2] \& C[1]$$

$$GA[1] = X[1]$$
$$PA[1] = \overline{Y[1]}$$
$$H[1] = (\overline{|X[m:1]}) \& Y[1]$$
$$C[1] = GA[1]|(PA[1] \& C[0])$$
$$R[1] = H[1] \& C[0]$$

$$GA[0] = X[0]$$
$$PA[0] = \overline{Y[0]}$$
$$H[0] = (\overline{|X[m:0]}) \& Y[0]$$
$$C[0] = GA[0]|(PA[0])$$
$$R[0] = H[0]$$

Second Embodiment

Similarly to the processing circuit 600 of the first embodiment, a processing circuit 600 according to a second embodiment includes a high-order mask processing unit 601, a low-order mask processing unit 602, and an output synthesizing unit 603. However, as compared with the processing circuit 600 according to the first embodiment, the processing circuit 600 according to the second embodiment is different in the high-order mask processing unit 602 and is the same in the low-order mask processing unit 602 and the output synthesizing unit 603. The high-order mask processing unit 601 according to the second embodiment is modified from the high-order mask processing unit 601 according to the first embodiment so as to be capable of high-speed processing. Hereinafter, the configuration of the high-order mask processing unit 602 according to the second embodiment will be described.

Figure 12:
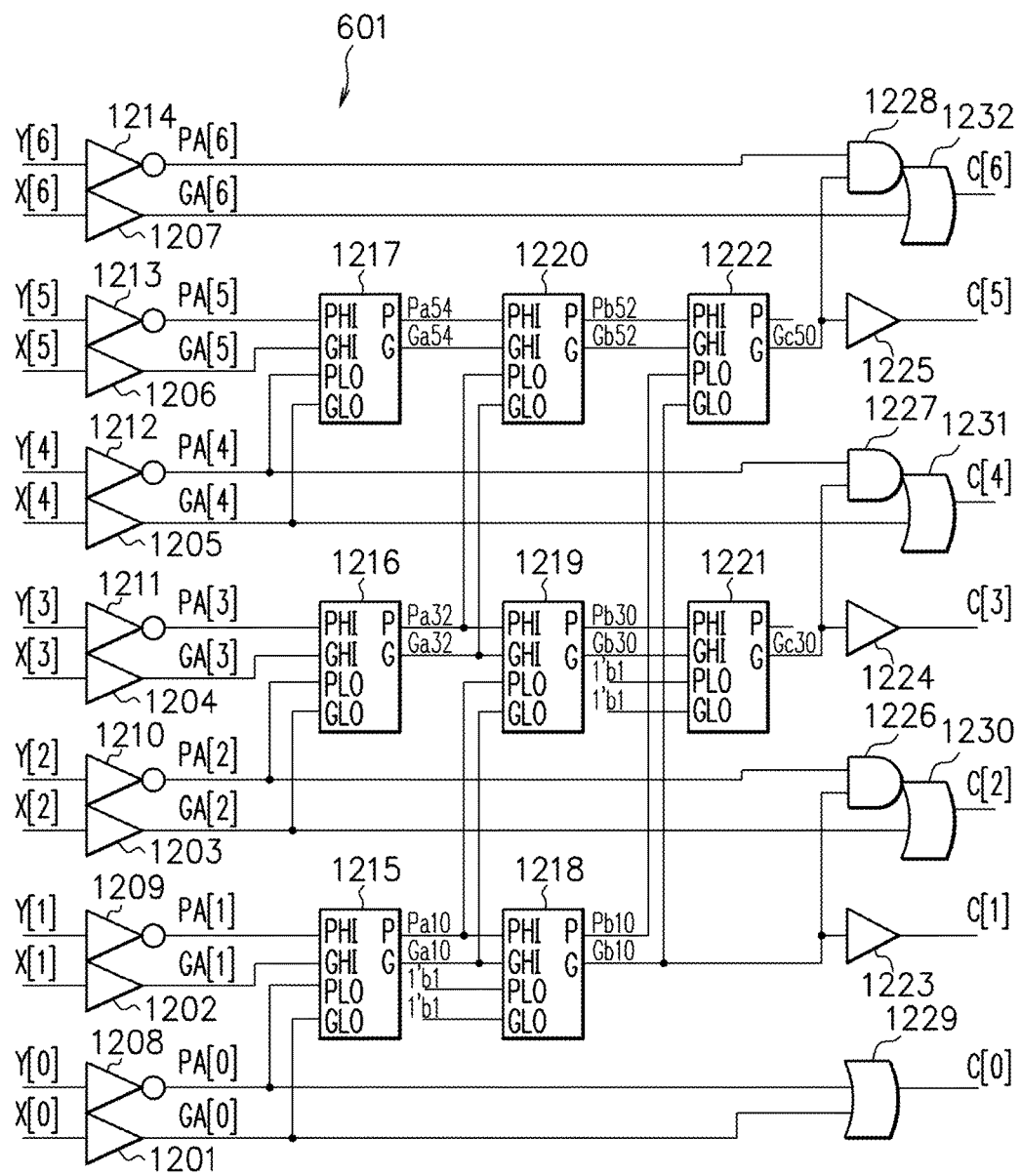
FIG. 12 is a circuit diagram illustrating a configuration example of a high-order mask processing unit according to a second embodiment.

FIG. 12 is a circuit diagram illustrating a configuration example of the high-order mask processing unit 601 according to the second embodiment. The high-order mask processing unit 601 includes buffers 1201 to 1207, inverters 1208 to 1214, carry generating units 1215 to 1222, buffers 1223 to 1225, logical product operation circuits 1226 to 1228, and logical sum operation circuits 1229 to 1232. The carry generating units 1215 to 1222 mutually have the same configuration illustrated in FIG. 13 to be described later.

The buffer 1201 outputs a bit GA[0] having the same logic value as that of the bit X[0]. The inverter 1208 outputs a logically inverted bit PA[0] of the bit Y[0]. The buffer 1202 outputs a bit GA[1] having the same logic value as that of the bit X[1]. The inverter 1209 outputs a logically inverted bit PA[1] of the bit Y[1]. The buffer 1203 outputs a bit GA[2] having the same logic value as that of the bit X[2]. The inverter 1210 outputs a logically inverted bit PA[2] of the bit Y[2]. The buffer 1204 outputs a bit GA[3] having the same logic value as that of the bit X[3]. The inverter 1211 outputs a logically inverted bit PA[3] of the bit Y[3]. The buffer 1205 outputs a bit GA[4] having the same logic value as that of the bit X[4]. The inverter 1212 outputs a logically inverted bit PA[4] of the bit Y[4]. The buffer 1206 outputs a bit GA[5] having the same logic value as that of the bit X[5]. The inverter 1213 outputs a logically inverted bit PA[5] of the bit Y[5]. The buffer 1207 outputs a bit GA[6] having the same logic value as that of the bit X[6]. The inverter 1214 outputs a logically inverted bit PA[6] of the bit Y[6].

The carry generating unit 1215 receives the bit GA[0] at its input terminal GLO, receives the bit PA[0] at its input terminal PLO, receives the bit GA[1] at its input terminal GHI, and receives the bit PA[1] at its input terminal PHI to output a carry bit Ga10 from its output terminal G and output a carry bit Pa10 from its output terminal P.

The carry generating unit 1216 receives the bit GA[2] at its input terminal GLO, receives the bit PA[2] at its input terminal PLO, receives the bit GA[3] at its input terminal GHI, and receives the bit PA[3] at its input terminal PHI to output a carry bit Ga32 from its output terminal G and output a carry bit Pa32 from its output terminal P.

The carry generating unit 1217 receives the bit GA[4] at its input terminal GLO, receives the bit PA[4] at its input terminal PLO, receives the bit GA[5] at its input terminal GHI, and receives the bit PA[5] at its input terminal PHI to output a carry bit Ga54 from its output terminal G and output a carry bit Pa54 from its output terminal P.

The carry generating unit 1218 receives 1 at its input terminal GLO, receives 1 at its input terminal PLO, receives the carry bit Ga10 at its input terminal GHI, and receives the carry bit Pa10 at its input terminal PHI to output a carry bit Gb10 from its output terminal G and output a carry bit Pb10 from its output terminal P.

The carry generating unit 1219 receives the carry bit Ga10 at its input terminal GLO, receives the carry bit Pa10 at its input terminal PLO, receives the carry bit Ga32 at its input terminal GHI, and receives the carry bit Pa32 at its input terminal PHI to output a carry bit Gb30 from its output terminal G and output a carry bit Pb30 from its output terminal P.

The carry generating unit 1220 receives the carry bit Ga32 at its input terminal GLO, receives the carry bit Pa32 at its input terminal PLO, receives the carry bit Ga54 at its input terminal GHI, and receives the carry bit Pa54 at its input terminal PHI to output a carry bit Gb52 from its output terminal G and output a carry bit Pb52 from its output terminal P.

The carry generating unit 1221 receives 1 at its input terminal GLO, receives 1 at its input terminal PLO, receives the carry bit Gb30 at its input terminal GHI, and receives the carry bit Pb30 at its input terminal PHI to output a carry bit Gc30 from its output terminal G.

The carry generating unit 1222 receives the carry bit Gb10 at its input terminal GLO, receives the carry bit Pb10 at its input terminal PLO, receives the carry bit Gb52 at its input terminal GHI, and receives the carry bit Pb52 at its input terminal PHI to output a carry bit Gc50 from its output terminal G.

The logical sum operation circuit 1229, which is a 2-input OR circuit, outputs the result of a logical sum operation on the bits GA[0] and PA[0], as the bit C[0]. The buffer 1223 outputs the bit C[1] having the same logic value as that of the carry bit Gb10. The logical product operation circuit 1226, which is a 2-input AND circuit, outputs the result of a logical product operation on the carry bit Gb10 and the bit PA[2]. The logical sum operation circuit 1230, which is a 2-input OR circuit, outputs the result of a logical sum operation on the output bit of the logical product operation circuit 1226 and the bit GA[2], as the bit C[2].

The buffer 1224 outputs the bit C[3] having the same logic value as that of the carry bit Gc30. The logical product operation circuit 1227, which is a 2-input AND circuit, outputs the result of a logical product operation on the carry bit Gc30 and the bit PA[4]. The logical sum operation circuit 1231, which is a 2-input OR circuit, outputs the result of a logical sum operation on the output bit of the logical product operation circuit 1227 and the bit GA[4], as the bit C[4].

The buffer 1225 outputs the bit C[5] having the same logic value as that of the carry bit Gc50. The logical product operation circuit 1228, which is a 2-input AND circuit, outputs the result of a logical product operation on the carry bit Gc50 and the bit PA[6]. The logical sum operation circuit 1232, which is a 2-input OR circuit, outputs the result of a logical sum operation on the output bit of the logical product operation circuit 1228 and the bit GA[6], as the bit C[6]. The high-order mask processing unit 601 outputs the bits C[0] to C[6] as the high-order mask binary number C[6:0].

As described above, the carry generating unit 1215 receives the lowest-order bit X[0] of the first operand X[7:0] at the input terminal GLO, receives the logically inverted bit PA[0] of the lowest-order bit Y[0] of the second operand Y[7:0] at the input terminal PLO, receives the second lowest-order bit X[1] of the first operand X[7:0] at the input terminal GHI, receives the logically inverted bit PA[1] of the second lowest-order bit Y[1] of the second operand Y[7:0] at the input terminal PHI to output the carry bit Ga10 from the output terminal G and output the carry bit Pa10 from the output terminal P.

The carry generating unit 1216 receives the third lowest-order bit X[2] of the first operand X[7:0] at the input terminal GLO, receives the logically inverted bit PA[2] of the third lowest-order bit Y[2] of the second operand Y[7:0] at the input terminal PLO, receives the fourth lowest-order bit X[3] of the first operand X[7:0] at the input terminal GHI, and receives the logically inverted bit PA[3] of the fourth lowest-order bit Y[3] of the second operand Y[7:0] at the input terminal PHI to output the carry bit Ga32 from the output terminal G and output the carry bit Pa32 from the output terminal P.

The carry generating unit 1219 receives the carry bit Ga10 at the input terminal GLO, receives the carry bit Pa10 at the input terminal PLO, receives the carry bit Ga32 at the input terminal GHI, and receives the carry bit Pa32 at the input terminal PHI to output the carry bit Gb30 from the output terminal G and output the carry bit Pb30 from the output terminal P.

FIG. 13 is a circuit diagram illustrating a configuration example of the carry generating unit 1215 in FIG. 12. The carry generating units 1216 to 1222 in FIG. 12 also have the same configuration as that of the carry generating unit 1215. The carry generating units 1215 to 1222 each include logical product operation circuits 1301, 1302 and a logical sum operation circuit 1303. The logical product operation circuit 1301, which is a 2-input AND circuit, outputs the result of a logical product operation on the bit of the input terminal PLO and the bit of the input terminal PHI to the output terminal P. The logical product operation circuit 1302 outputs the result of a logical product operation on the bit of the input terminal GLO and the bit of the input terminal PHI. The logical sum operation circuit 1303 outputs the result of a logical sum operation on the output bit of the logical product operation circuit 1302 and the bit of the input terminal GHI to the output terminal G.

As described above, according to the first and second embodiments, the processing circuit 600 is capable of the parallel processing by the high-order mask processing unit 601 and the low-order mask processing unit 602, and accordingly is capable of the high-speed calculation of the output value R[m:0]. Further, in the high-order mask processing unit 601, the carry generating units each are capable of generating the high-order carry bit by using the lower-order carry bit. This as a result enables a reduction in the area of the high-order mask processing unit 601 and the processing circuit 600. Further, in the first embodiment, the carry generating units of the high-order mask processing unit 601 each generate its carry bit by using the one-digit lower carry bit. On the other hand, in the second embodiment, each of the carry generating units of the high-order mask processing unit 601, instead of using the one-digit lower carry bit, groups the operations of the intermediate terms and generates its carry bit by using the one-group or more lower carry bit, enabling a further increase in the speed.

FIG. 14A is a chart illustrating ratios of the area and the processing time of the circuit elements used in the processing circuit 100 and the processing circuit 600. "2ANDOR" on the second lowest row in FIG. 14A represents the combination of the two logical product operation circuits 312, 313 and the one logical sum operation circuit 316 in FIG. 3. "ANDOR" on the lowest row in FIG. 14A represents the combination of the one logical product operation circuit 903 and the one logical sum operation circuit 904 in FIG. 9.

FIG. 14B is a chart illustrating ratios of the area and the processing time of the processing circuit 100 according to the basic technology, ratios of the area and the processing time of the processing circuit 600 according to the first embodiment, and ratios of the area and the processing time of the processing circuit 600 according to the second embodiment. In the processing circuit 100 according to the basic technology, the area ratio is 146 and the processing time ratio is 25 based on the circuit elements in FIG. 14A. In the processing circuit 600 according to the first embodiment, the area ratio is 84 and the processing time ratio is 12 based on the circuit elements in FIG. 14A. In the processing circuit 600 according to the second embodiment, the area ratio is 92 and the processing time ratio is 8.5 based on the circuit elements in FIG. 14A.

The processing circuits 600 according to the first and second embodiments are both smaller in the area and shorter in the processing time than the processing circuit 100 according to the basic technology. The processing circuit 600 according to the second embodiment achieves a 35% reduction in the area and a 65% reduction in the processing time as compared with the processing circuit 100 according to the basic technology. The larger the bit width m+1, the greater this effect is.

Further, the processing circuit 600 according to the second embodiment is shorter in the processing time than the processing circuit 600 according to the first embodiment, and thus is capable of the high-speed processing. The processing circuit according to the first embodiment is smaller in the area than the processing circuit 600 according to the second embodiment.

It should be noted that the above-described embodiments all only illustrate examples of embodiments in carrying out the present invention and should not be construed as limiting the technical scope of the present invention. That is, the present invention can be embodied in a variety of forms without departing from its technical idea or its main features.

In one aspect, it is possible to achieve a processing circuit capable of high-speed processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processing circuit configured to receive a first binary number composed of a plurality of bits and a second binary number composed of a plurality of bits, and with a digit of the most significant 1-valued bit in the first binary number composed of the plural bits being defined as a first bit digit and with a digit of a bit having a value of 1 first in a higher-order direction than the first bit digit in the second binary number composed of the plural bits being defined as a second bit digit, output a third binary number composed of a plurality of bits out of which a bit corresponding to the second bit digit has a value of 1 and other bits have values of 0, the processing circuit comprising:
   a high-order mask processing unit configured to receive the first binary number and the second binary number and output a fourth binary number composed of a plurality of bits out of which a bit corresponding to the second bit digit has a value of 1 and a higher-order bit than the bit corresponding to the second bit digit has a value of 0;
   a low-order mask processing unit configured to receive the first binary number and the second binary number and output a fifth binary number composed of a plurality of bits out of which a bit corresponding to the second bit digit has a value of 1 and a lower-order bit than the bit corresponding to the second bit digit has a value of 0; and
   an output synthesizing unit configured to receive the fourth binary number and the fifth binary number and output the third binary number composed of the plural bits out of which the bit corresponding to the second bit digit has the value of 1 and the other bits have the values of 0.

2. The processing circuit according to claim 1, wherein:
the first binary number and the second binary number are each composed of m+1 bits (m is a natural number);
the high-order mask processing unit is configured to receive low-order m bits in the first binary number composed of the m+1 bits and low-order m bits in the second binary number composed of the m+1 bits, and output the fourth binary number composed of m bits;
the low-order mask processing unit is configured to receive the first binary number composed of the m+1 bits and the second binary number composed of the m+1 bits, and output the fifth binary number composed of m+1 bits; and
the output synthesizing unit is configured to receive the fourth binary number composed of the m bits and the fifth binary number composed of the m+1 bits, and output the third binary number composed of m+1 bits.

3. The processing circuit according to claim 2, wherein the output synthesizing unit includes a first logical product operation unit configured to perform a logical product operation on high-order m bits in the fifth binary number composed of the m+1 bits and the fourth binary number composed of the m bits, and output high-order m bits in the third binary number composed of the m+1 bits, and the output synthesizing unit is configured to output the least significant bit of the fifth binary number as the least significant bit of the third binary number.

4. The processing circuit according to claim 2, wherein the low-order mask processing unit includes:
a first negative logical sum operation unit configured to perform a negative logical sum operation on bits in a plurality of combinations of the m+1 bits of the first binary number; and
a second logical product operation unit configured to perform a logical product operation on a result of the negative logical sum operation by the first negative logical sum operation unit and the second binary number, and output the fifth binary number.

5. The processing circuit according to claim 2, wherein:
the high-order mask processing unit includes a plurality of carry generating units each configured to perform an operation for each bit group in the first binary number and the second binary number, and generate an own carry bit; and
the plural carry generating units are each configured to perform the operation based on the bit group in the first binary number and the second binary number and the carry bit generated by the carry generating unit corresponding to a lower-order bit.

6. The processing circuit according to claim 5, wherein the plural carry generating units correspond to digits of bits respectively and are each configured to receive bits at the same digit in the first binary number and the second binary number and the carry bit generated by the carry generating unit corresponding to the lower-order bit, and output the own carry bit as the fourth binary number.

7. The processing circuit according to claim 6, wherein the plural carry generating units each include:
a third logical product operation unit configured to output a result of a logical product operation on a logically inverted bit of the bit of the second binary number and the inputted carry bit; and
a first logical sum operation unit configured to perform a logical sum operation on an output bit of the third logical product operation unit and the bit of the first binary number, and output the own carry bit as a bit of the fourth binary number.

8. The processing circuit according to claim 5, wherein the plural carry generating units include:
a first carry generating unit configured to receive the lowest-order bit of the first binary number at a first input terminal, receive a logically inverted bit of the lowest-order bit of the second binary number at a second input terminal, receive the second lowest-order bit of the first binary number at a third input terminal, receive a logically inverted bit of the second lowest-order bit of the second binary number at a fourth input terminal, output a first carry bit from a first output terminal, and output a second carry bit from a second output terminal;
a second carry generating unit configured to receive the third lowest-order bit of the first binary number at a first input terminal, receive a logically inverted bit of the third lowest-order bit of the second binary number at a second input terminal, receive the fourth lowest-order bit of the first binary number at a third input terminal, receive a logically inverted bit of the fourth lowest-order bit of the second binary number at a fourth input terminal, output a third carry bit from a first output terminal, and output a fourth carry bit from a second output terminal; and
a third carry generating unit configured to receive the first carry bit at a first input terminal, receive the second carry bit at a second input terminal, receive the third carry bit at a third input terminal, receive the fourth carry bit at a fourth input terminal, output a fifth carry bit from a first output terminal, and output a sixth carry bit from a second output terminal.

9. The processing circuit according to claim 8, wherein configurations of the first to third carry generating units are identical to one another.

10. The processing circuit according to claim 8, wherein the first to third carry generating units each include:
a fourth logical product operation unit configured to output a result of a logical product operation on the bit of the first input terminal and the bit of the fourth input terminal;
a second logical sum operation unit configured to output a result of a logical sum operation on an output bit of the fourth logical product operation unit and the bit of the third input terminal to the first output terminal; and
a fifth logical product operation unit configured to output a result of a logical product operation on the bit of the second input terminal and the bit of the fourth input terminal to the second output terminal.

11. The processing circuit according to claim 1, wherein the first binary number is a first operand, and the second binary number is a second operand.

12. A control method of a processing circuit, the processing circuit being configured to receive a first binary number composed of a plurality of bits and a second binary number composed of a plurality of bits, and with a digit of the most significant 1-valued bit in the first binary number composed of the plural bits being defined as a first bit digit and with a digit of a bit having a value of 1 first in a higher-order direction than the first bit digit in the second binary number composed of the plural bits being defined as a second bit digit, output a third binary number composed of a plurality of bits out of which a bit corresponding to the second bit digit has a value of 1 and other bits have values of 0, and the control method comprising:

receiving, by a high-order mask processing unit included in the processing circuit, the first binary number and the second binary number and outputting a fourth binary number composed of a plurality of bits out of which a bit corresponding to the second bit digit has a value of 1 and a higher-order bit than the bit corresponding to the second bit digit has a value of 0;

receiving, by a low-order mask processing unit included in the processing circuit, the first binary number and the second binary number and outputting a fifth binary number composed of a plurality of bits out of which a bit corresponding to the second bit digit has a value of 1 and a lower-order bit than the bit corresponding to the second bit digit has a value of 0; and receiving, by an output synthesizing unit included in the processing circuit, the fourth binary number and the fifth binary number and outputting the third binary number composed of the plural bits out of which the bit corresponding to the second bit digit has the value of 1 and the other bits have the values of 0.

* * * * *